Figure 1:
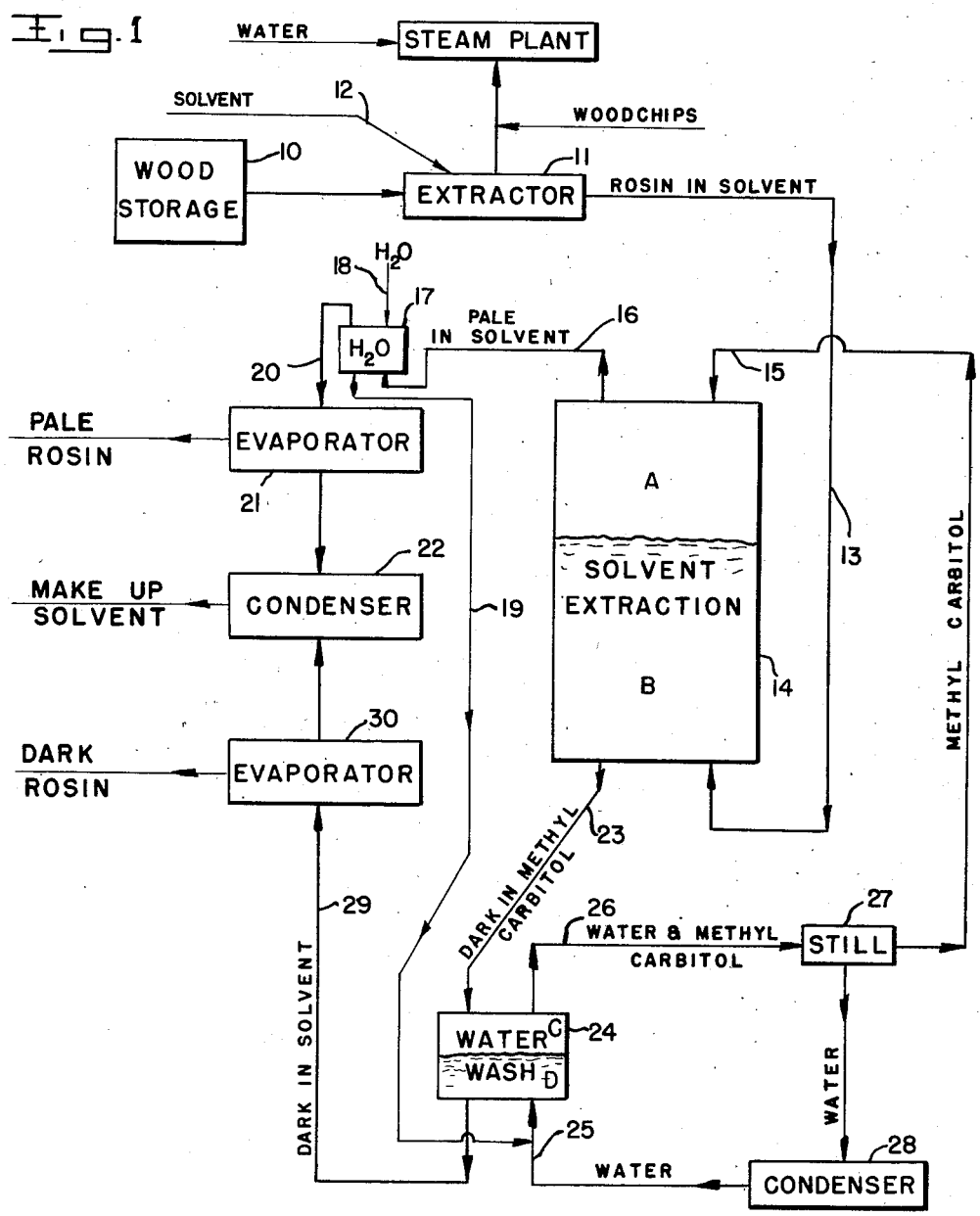

Oct. 30, 1951 W. G. KNOX ET AL 2,573,454
PURIFICATION OF WOOD ROSIN
Filed May 23, 1949 2 SHEETS—SHEET 1

INVENTOR
GEORGE L. CUNNINGHAM
WILLIAM G. KNOX
By Toulmin & Toulmin
ATTORNEYS

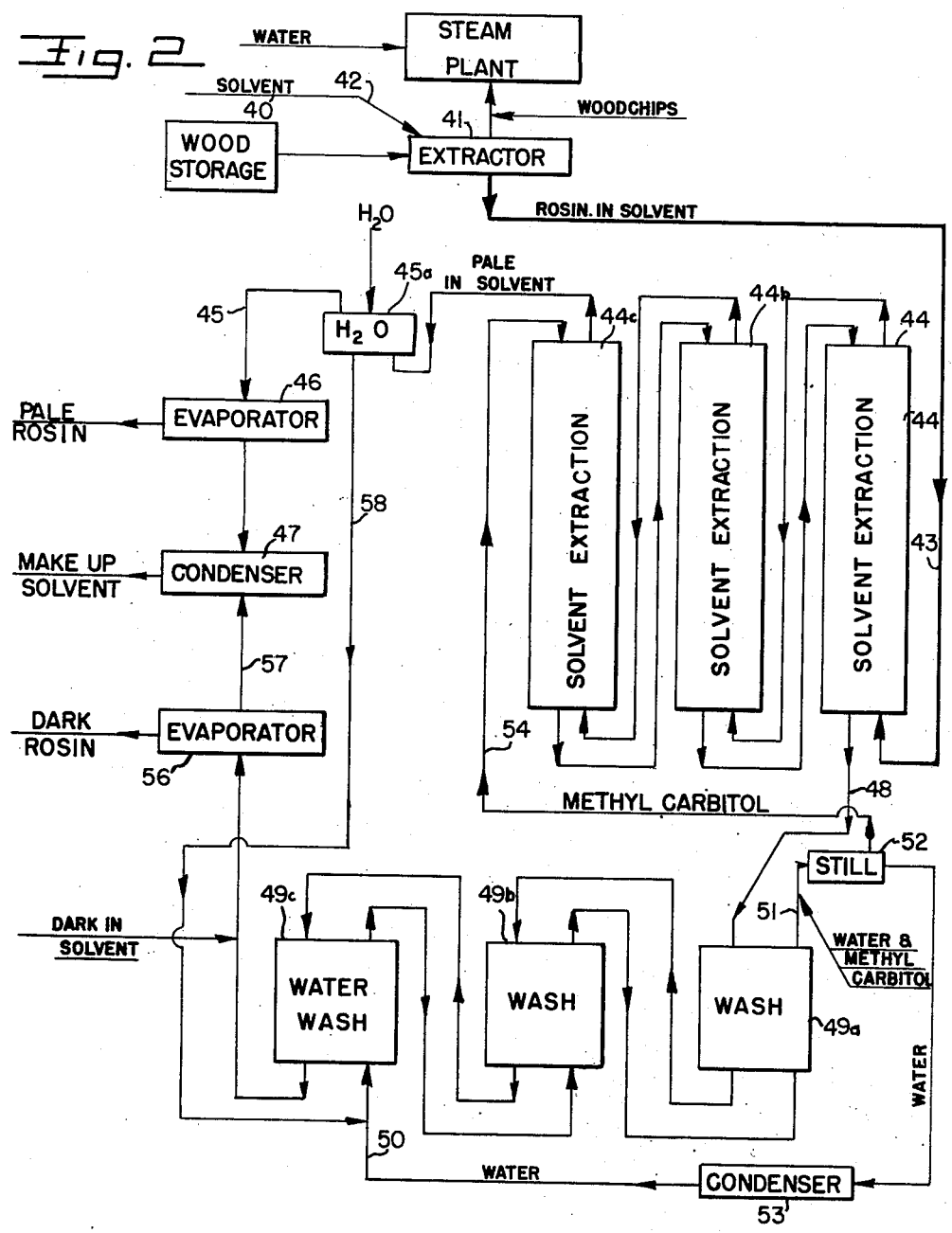

Patented Oct. 30, 1951

2,573,454

UNITED STATES PATENT OFFICE 2,573,454

PURIFICATION OF WOOD ROSIN

William G. Knox, Dayton, and George L. Cunningham, Cincinnati, Ohio, assignors, by mesne assignments, to Howard M. Hempstead and Louise M. Hempstead, Mobile, Ala.

Application May 23, 1949, Serial No. 94,852

5 Claims. (Cl. 260—111)

This invention relates to a method of treating rosin, and more particularly to the purification of rosin by extractive methods. Still more particularly it relates to a method for removing dark colored material from wood rosin to lighten its color and improve its solubility.

Rosins of the trade are judged for purity by the lightness of their color. Those having a clear bleached straw color are called WW, or water white rosins, and command a premium price. Near the bottom of the rating scale are the FF and G rosins, which have a dark black-brown color. These dark colored rosins constitute a large percentage of the rosin yield from present manufacturing procedures.

In order to obtain higher yields of premium grade rosins, the crude rosins have been subjected to such treatments as precipitation of a portion of the rosin by the use of strong acids or strong alkalis, absorption of color bodies by diatomaceous earth, activated charcoal and the like, vacuum distillation, liquid phase extraction, or a combination of various of the above methods.

All of the above mentioned methods have objectionable features, most important of which are loss of product, cost of reagents, non-recoverability of a big proportion of the reagents, time consuming nature of filtration steps when removing absorbents and precipitates from viscous sticky rosin mixtures.

One process has been patented which involves extraction of rosins with liquid agents, but has met with indifferent success and so far as we know has received only limited acceptance in the industry because of the cost of reagents, such as furfurol, toluol, and diethylene glycol monomethyl ether, and the heavy losses of these reagents.

In these processes, after the color body solvents have extracted a portion of the color bodies from a naphtha solution of rosin, the solvent solution is removed to recovery units where the solvent is separated and recovered by distillation.

Due to inability to remove all the solvent from the residue, large losses with consequent heavy operating costs are incurred. The losses when attempting to utilize methyl carbitol which boils at about 193° C. have been such as to class this process out of the competitive market.

It is the primary object of this invention, therefore, to provide a process for the purification of wood rosin which overcomes the disadvantages of processes utilized heretofore.

It is another object of this invention to provide a process capable of producing a greater color improvement in wood rosins that has been evidenced heretofore.

Still another object of this invention is to provide a process whose economics are such that the cost of purified products is not rendered prohibitive.

A still further object of this invention is to provide a process wherein the loss of solvents is almost negligible.

It is a still further object of this invention to provide a process wherein the steps are adaptable to batch or continuous operation.

A further object of this invention is to provide a process wherein expensive solvents are merely transfer agents and as such recoverable for recycling through various process steps.

A still further object of this invention is to provide a process wherein water is utilized as one of the reagents.

In accordance with the process of this invention, there is formed and separated several combinations of immiscible solvents which are separable into homogeneous solution phases from which product and solvent are relatively completely separated and recovered.

By this process a major portion of the rosin product is recovered as upgraded higher value rosin and only a very minor proportion of the rosin is recovered as dark low grade rosin.

Advantage is taken in this process of the discovery that, for example, diethylene glycol monomethyl ether has very limited solubility in naphtha, whereas, the naphtha is slightly soluble in diethylene monomethyl ether and in combination therewith makes an effective medium for accumulation of soluble color bodies.

The process is simplified by the discovery that naphthas and color bodies are so insoluble in diethylene glycol monomethyl ether diluted with water that substantially complete phase separation is possible.

In brief, the process is carried out by preparing a solution of rosin in a primary solvent, extracting the primary solvent with a secondary solvent to form a two phase system in which the secondary solvent phase preferentially dissolves the color bodies, effecting phase separation between primary and secondary solvents by diluting the secondary solvent phase with an agent miscible with the secondary solvent and relatively completely recoverable from said solvent-agent mixture and recovering two or more rosin portions from their primary solvent solutions by distillation.

Several combinations of solvents and springing agent may be used. In the preferred embodiment, explained in more detail in conjunction with the flow diagrams the combination comprises naphtha as a primary solvent, diethylene glycol monomethyl ether as secondary solvent, and water as the springing agent.

Other materials useful as primary solvents are hydrocarbon distillates, such as benzene, toluene, and the like.

We have found it possible to use as secondary solvents alcohol-ethers, such as diethylene glycol monoethyl ether, alcohols having an inorganic substitution radical, such as 2-nitro-1-propanol, 2-nitro-1-butanol, and ketones such as acetonyl acetone, and the like.

When utilizing alcohol-ethers, alcohols, and the like, as secondary solvents, water serves as an inexpensive and efficient springing agent.

Inasmuch as the springing agent is merely recycled complete separation from the solvent is unnecessary. It is preferred, however, to choose springing agents which are separable into a recycle stream containing less than 5% of the solvent.

The economy of the extraction system naturally depends upon the relative quantities of solvents which must be circulated. In this system run at room temperatures, the quantities are limited by the viscosity of the rosin solution which can be efficiently extracted and the concentration of color bodies which may be advantageously accumulated in the rosin-color body-primary solvent solution sprung from the secondary solvent.

The concentration of rosin in the primary solvent is generally limited to between 5 and 30% of rosin by weight and preferably in the range of 17 to 22% of rosin.

The concentration of color bodies is generally limited to a maximum of about 20% by weight in the mixed solvent phase. Concentrations below 10% are considered poor operation in treating a rosin for the first time.

In repeated extraction processes, naturally the concentration of color bodies would be so reduced that the concentration of color bodies in a solvent would not reach 10% with any appreciable circulation of secondary solvent and therefore the invention is not tied to any lower limit.

For each 10 volumes of primary solvent and rosin fed to the extraction system, it is preferred to circulate 2 to 2.5 volumes of secondary solvent. This solvent ratio, however, may be varied within limits, depending upon the contamination of the rosin with less than 5 to 1 ratio seldom being maintained.

The volume ratio of secondary solvent solution to water is preferably about 1 volume of solution to ½ volume of water. Ratios lower than this necessitate close watch over the process to insure against loss of secondary solvent. Higher ratio may be used but are merely a means of insuring removal of secondary solvent without need for close control of the extraction system.

Referring to the drawings for a more specific description of the process with reference to naphtha as the primary solvent, methyl carbitol (diethylene glycol monomethyl ether) as secondary solvent, and water as springing agent:

Figure 1 illustrates the batch process; and

Figure 2 diagrammatically represents a continuous system.

In Figure 1, there is shown a wood storage 10. From the wood storage 10 wood chips are fed to an extractor 11 where the rosin is leached from the wood by solvent naphtha fed to the extractor through line 12. Disposal of the wood constitutes no part of this invention, so is merely indicated.

The naphtha solution of rosin flows through line or pipe 13 to the inlet at the bottom of an extraction chamber 14.

Methyl carbitol enters the top of the chamber 14 from line 15. After thorough mixing in the chamber 14 and the solutions having been allowed to settle, the solutions separate into two phases.

Phase A which consists of rosin, naphtha and a small quantity of methyl carbitol is withdrawn from the top of chamber 14 through conduit 16.

Water is introduced into phase A in a phase segregating chamber 17 through pipe 18. From this chamber 17 the water-methyl carbitol solution is withdrawn through line 19 and is combined into a stream of water serving another purpose.

The rosin and naphtha solution is withdrawn from chamber 17 to an evaporator 21 through line 20, where the solvent is distilled from the rosin. The volatile solvent is drawn into the condenser 22, where it is liquified preparatory to being returned to the system through line 12.

Phase B which constitutes a small amount of naphtha, color bodies and methyl carbitol is conducted through a pipe 23 to a water wash or solvent springing tank 24.

Water is introduced through line 25. After thorough agitation, followed by settling, the solution separates into two phases C and D. Phase C is water and methyl carbitol which is withdrawn from tank 24 to still 27 through line 26.

In the still 27 the water is distilled and condensed into condenser 28 which supplies the water to recycling line 25. Methyl carbitol is withdrawn from still 27 through line 15 for recycling to the extraction system.

Phase D consisting of naphtha, rosin and color bodies is withdrawn from water wash chamber through pipe 29 to an evaporator 30. The naphtha is volatilized by heat and the vapors liquified in the condenser 22.

The solid product from evaporator 30 consists of about 20 to 25% of the rosin recovered and contains a major portion of the color bodies which gives the product about a B rating.

The solid product from evaporator 21 consists of between 75 and 80% of the yield of rosin, which rosin has enough graded color of, for example, K compared to a normal brownish grade for some product, for example, for FF.

As in Figure 1, it will be noted with reference to Figure 2, that there is provided a wood storage. This is indicated at 40. From this wood storage wood chips are fed to an extractor 41 where the rosin is leached from the wood by solvent naphtha fed to the extractor through line 42. The naphtha solution of rosin flows through the line 43 to the inlet at the bottom of a counter-current extraction chamber 44, which may be a single unit or be, as illustrated here, made up of three components 44a, 44b and 44c.

Methyl carbitol enters component 44c at the top and flows counter current to the rosin solution through 44c, 44b and 44a, and leaves the bottom of chamber 44a as a solution fat in color bodies.

The rosin solution flowing in series through chambers 44a, 44b and 44c is withdrawn from the top of chamber 44c as a pale rosin solution. This rosin solution flows through a pipe 45 to an evaporator 46 where the naphtha is distilled from the rosin.

Intermediate the extraction chamber and the evaporator, there may be installed a small tank in which water is mixed with the solution to insure complete removal of methyl carbitol from the rosin solution. This tank is indicated at 45a. Water and methyl carbitol is removed from tank 45a through pipe 58, and introduced into line 50 hereinafter explained in detail.

The volatilized naphtha is drawn into the condenser 47 where it is condensed preparatory to being returned to the system through line 42.

The fat methyl carbitol solution issuing from the bottom of chamber 44a is conducted through pipe 48 to a water wash section which may consist of a single countercurrent washing tower or, as illustrated, a unit composed of three chambers 49a, 49b, and 49c.

The fat solution flows into the wash circuit through the top of chamber 49a downward and flows in series through chambers 49a and 49c. From the chamber 49c the almost stripped solution meets water which is fed into the bottom of chamber 49c through line 50.

The water begins to pick up methyl carbitol in the chamber 49 and flows countercurrent to the methyl carbitol solution through chambers 49c, 49b, and 49a, to issue from the top of chamber 49a as a solution of water and methyl carbitol flowing through line 51 to a still or fractionating unit 52.

The volatile water is stripped from the methyl carbitol by heating, is conducted to the condenser 53, from whence the water is returned to the system through pipe 50.

The stripped methyl carbitol is returned to the extraction system from still 52 through line 54. The rosin-color body naphtha solution issuing from the bottom of chamber 49c is conducted to an evaporator 56 through conduit 55. In the evaporator the naphtha is volatilized and conducted to the common condenser 47 through line 57.

While the method and apparatus disclosed and described herein illustrate a preferred form of invention, yet it will be understood that modifications can be made without departing from the spirit of the invention, and that modifications that fall within the scope of the appended claims are intended to be included herein.

For example, it will be understood that the starting point may not be with an extractor, but the solution may be prepared from a poor grade rosin. It will also be understood that for different combinations of solvents, the volume ratio of the various streams may be altered to maintain operations at maximum efficiency.

We claim:

1. The method of purifying a quantity of rosin comprising: preparing an approximately 20% by weight solution of rosin in solvent naphtha, countercurrently extracting the solution at room temperature by the use of diethylene glycol monoethyl ether, distilling the rosin solution containing approximately 80% of the rosin content to separately recover a light colored rosin and naphtha, adding water to the ether solution phase, separating a naphtha-rosin-color body solution containing approximately 20% of the total quantity of rosin and the water-ether solution, distilling the naphtha from the rosin-color body mixture, and distilling the ether-water solution to recover the individual components.

2. The method of purifying a quantity of rosin comprising; preparing an approximately 20% by weight of rosin in solvent naphtha, countercurrently extracting the solution at room temperature by the use of diethylene glycol monoethyl ether, distilling the rosin solution containing approximately 80% of the rosin content to separately recover light colored rosin and naphtha, countercurrently washing the ether solution phase with water, distilling the naphtha-rosin-color body solution containing approximately 20% of the total quantity of rosin processed, and rectifying the water-ether solution to recover the reagent for recirculation in the system.

3. The method of purifying a quantity of rosin comprising: preparing an approximately 20% by weight solution of rosin in solvent naphtha, countercurrently extracting the solution at room temperature with approximately ¼ volume of diethylene glycol monoethyl ether for each volume of solution, distilling the rosin solution containing approximately 75% of the rosin content to separately recover light colored rosin and naphtha, countercurrently washing the ether solution phase with water, distilling the naphtha-rosin-color body solution containing approximately 25% of the total quantity of rosin processed, and rectifying the water-ether solution to recover the reagent for recirculation in the system.

4. The method of purifying a quantity of rosin comprising: preparing a 20% by weight solution of rosin in a volume of solvent naphtha, extracting the solution with approximately ¼ to ½ volume of diethylene glycol monoethylene for each volume of solution, settling the mixture, separating a rosin-naphtha rich phase and an ether rich phase, distilling said rosin solution to recover the solvent for recirculation in the system, adding approximately ½ to 1 volume of water for each volume of solution to the ether rich phase, segregating the resulting naphtha phase and ether-water phase, and separately recovering naphtha, dark rosin, ether and water by distilling said phases.

5. The method of purifying a quantity of rosin comprising: preparing a solution of rosin in solvent naphtha, bringing the solution at room temperture in contact with diethylene glycol monoethyl ether, distilling the rosin solution to separately recover light colored rosin and naphtha, countercurrently washing the ether solution phase with water, distilling the naphtha-rosin-color body solution, and rectifying the water ether solution to recover the reagent for recirculation in the system.

WILLIAM G. KNOX.
GEORGE L. CUNNINGHAM.

REFERENCES CITED

The following references are of record in the file of this patent:

UNITED STATES PATENTS

| Number | Name | Date |
|---|---|---|
| 1,905,173 | Humphrey | Apr. 25, 1933 |
| 2,117,572 | Rankin | May 17, 1938 |
| 2,325,410 | Lister | July 27, 1943 |
| 2,336,546 | Jones | Dec. 14, 1943 |
| 2,336,547 | Jones | Dec. 14, 1943 |